United States Patent
Spracklen et al.

(10) Patent No.: US 9,448,816 B2
(45) Date of Patent: Sep. 20, 2016

(54) VIRTUAL DESKTOP INFRASTRUCTURE (VDI) CACHING USING CONTEXT

(71) Applicant: VMware, Inc., Palo Alto, CA (US)

(72) Inventors: Lawrence Spracklen, Boulder Creek, CA (US); Banit Agrawal, Sunnyvale, CA (US); Rishi Bidarkar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 531 days.

(21) Appl. No.: 13/872,969

(22) Filed: Apr. 29, 2013

(65) Prior Publication Data

US 2014/0325372 A1    Oct. 30, 2014

(51) Int. Cl.
| | | |
|---|---|---|
| G06F 3/0484 | (2013.01) | |
| G06F 9/44 | (2006.01) | |
| G06F 12/12 | (2016.01) | |
| G06F 3/14 | (2006.01) | |

(52) U.S. Cl.
CPC ........... *G06F 9/4445* (2013.01); *G06F 3/1454* (2013.01); *G06F 12/121* (2013.01); *G09G 2360/121* (2013.01); *G09G 2370/02* (2013.01); *G09G 2370/022* (2013.01)

(58) Field of Classification Search
None
See application file for complete search history.

(56) References Cited

U.S. PATENT DOCUMENTS

| | | | |
|---|---|---|---|
| 7,847,755 B1* | 12/2010 | Hardebeck | G06F 3/1415 345/2.1 |
| 8,230,008 B2* | 7/2012 | Tsirkin et al. | 709/203 |
| 2008/0256294 A1* | 10/2008 | Gill | G06F 12/0897 711/117 |
| 2009/0307428 A1* | 12/2009 | Schmieder et al. | 711/118 |
| 2011/0197151 A1* | 8/2011 | Abdo et al. | 715/764 |
| 2012/0226742 A1* | 9/2012 | Momchilov et al. | 709/203 |
| 2013/0036269 A1* | 2/2013 | Kaplinger et al. | 711/122 |
| 2013/0227218 A1* | 8/2013 | Chang | G06F 12/0866 711/118 |
| 2014/0068183 A1* | 3/2014 | Joshi et al. | 711/114 |
| 2014/0115256 A1* | 4/2014 | Liu | G06F 12/0866 711/122 |
| 2014/0173214 A1* | 6/2014 | Ramrakhyani et al. | 711/135 |
| 2014/0258672 A1* | 9/2014 | Herron | G06F 12/0223 711/171 |

* cited by examiner

*Primary Examiner* — Ulka Chauhan
*Assistant Examiner* — Patrick F Valdez

(57) ABSTRACT

In one embodiment a method for storing a remote desktop GUI image block in a cache including a plurality of persistence levels is described. The method is comprised of maintaining each persistence level in the plurality of persistence levels; identifying an event associated with an update to the remote desktop GUI; determining a context for the event; selecting one of the persistence levels for the event based on the context; and storing an image block corresponding to the update in the selected one of the persistence levels.

20 Claims, 6 Drawing Sheets

VIRTUAL DESKTOP INFRASTRUCTURE (VDI) CACHING USING CONTEXT

BACKGROUND

Display remoting protocols are used in a variety of contexts for transmitting computer display information from a source location to a destination. In virtual desktop infrastructure (VDI) systems, a display remoting protocol allows a user at a client device to view and interact with a virtual machine hosted remotely from the user. However, display remoting protocols are also used in many other circumstances, including desktop sharing and web conference hosting software, software that enables users to access their home or office personal computer when travelling, and other remote desktop services that present individual application GUIs to remote users. There are a large variety of display remoting protocols available or known, including RDP and RemoteFX available from Microsoft, Inc., ICA and HDX available from Citrix Systems, Inc., EOP available from Quest, SPICE available from Red Hat, RGS available from HP, ALP and AIP available from Oracle Corporation, PCoIP available from Teradici Corporation, and VNC/RFB available from RealVNC, Ltd, with variants of VNC/RFB being otherwise available under open source licenses.

One challenge for display remoting protocols is to deliver a fluid GUI experience from the host to the client device while minimizing network bandwidth and both host and client device computer processing unit (CPU) resources. Some display remoting protocols meet the challenge by employing video compression schemes to reduce the amount of image content sent over the network. Moreover, because many images are transmitted from the server to the client device multiple times during a user's VDI session, some display remoting protocols have been proposed that include client-side caching to store image content on the client device for reuse. For example, if a user minimizes a window, and then restores the minimized window, client-side caching can be used to restore the window using image data retrieved from the cache without retransmitting the graphical data from the server. If the server detects that a needed image is already cached by the client device, the client device can be instructed to use the cached copy.

As the size of the cache is increased, more image data may be stored in the cache, thus increasing the likelihood that the client device will be storing a needed image in the cache. Although having a large cache capacity is desirable because it reduces the need for the host to retransmit images to the client device, many client devices are memory-constrained such as thin clients and mobile devices so it is not always possible to simply increase the cache size to improve cache performance.

SUMMARY

In one embodiment, a method for storing a remote desktop GUI image block in a cache including a plurality of persistence levels is described. The method is comprised of maintaining each persistence level in the plurality of persistence levels; identifying an event associated with an update to the remote desktop GUI; determining a context for the event; selecting one of the persistence levels for the event based on the context; and storing an image block corresponding to the update in the selected one of the persistence levels.

The following detailed description and accompanying drawings provide a better understanding of the nature and advantages of particular embodiments.

DETAILED DESCRIPTION

In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Overview

Figure 1:
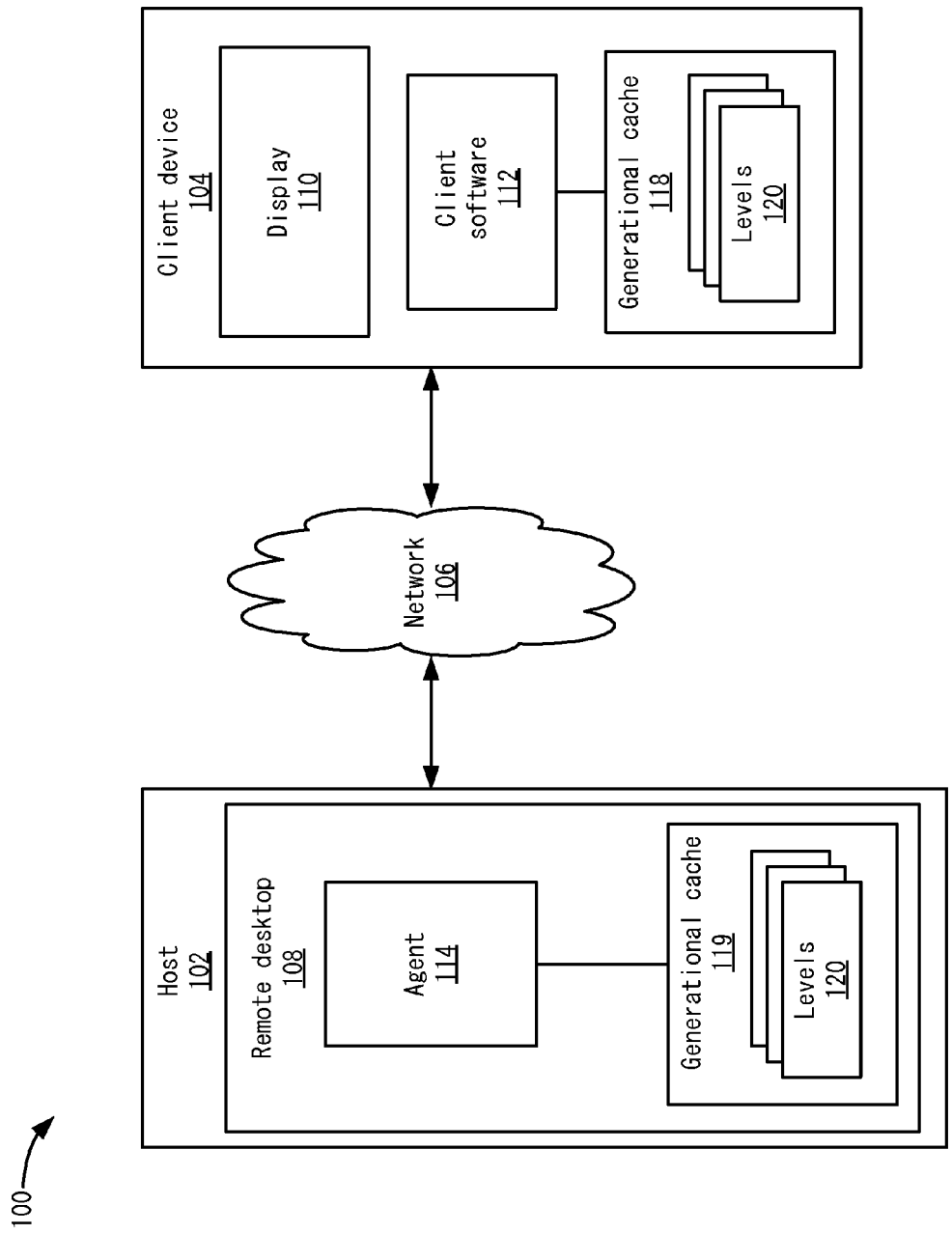
FIG. 1 depicts a simplified system of a remote desktop environment that uses a generational cache according to one embodiment.

FIG. 1 depicts a simplified system 100 of a remote desktop environment that uses a generational cache according to one embodiment. System 100 includes a host 102 and a client device 104 that communicate through a network 106. Host 102 and client device 104 use a display remoting protocol to display an image at client device 104 of a GUI (not shown) that is provided by the remote desktop running on host 102. For example, client 104 updates frames of the image of the desktop GUI on a display 110.

In one embodiment, remote desktop 108 may be a virtual machine having a guest operating system and guest applications executing in a virtualized environment, as generally understood in the field of computer virtualization. It should be understood that, although a virtualized environment is presently described, the invention may be implemented in physical computer without virtualization. For example, the invention may be implemented in any context where display remoting is implemented, such as desktop sharing, remote access, and other environments where a remote application running on a computer system transmits image data for frame updates to a client device.

The transmission of the desktop GUI generated by remote desktop 108 to client device 104 may be referred to as display remoting. In conjunction with display remoting, client software 112 may send input/output (I/O) commands from peripheral devices associated with client device 104 to remote desktop 108. An agent 114 processes the input/output commands and sends, according to some display remoting protocols, image blocks for a frame update to client software 112. Client software 112 then updates an image of the desktop GUI on display 110 using the image blocks. For example, a user may use a mouse to drag a window on the desktop GUI. Client software 112 detects the mouse click-and-drag events and sends the mouse events to remote desktop 108. Agent 114 processes the I/O command causing the window to move across an image of the desktop GUI. Agent 114 then sends frame updates to client software 112, which updates the image of the desktop GUI being displayed on display 110 to show the movement. In some examples, the entire desktop image need not be updated in response to the window drag; rather, the display remoting protocol may determines which sub-regions of the desktop image has changed as a result of this operation and only updates these changed regions.

In one embodiment, client software 112 may use a generational cache 118 to display frame updates of the image of the desktop GUI. For example, client software 112 may cache image blocks such that recurring images can be retrieved from generational cache 118, which reduces the bandwidth required to send frame updates from agent 114 to client software 112. It should be understood that when the term "image" is used, the image may be a portion of the display of the desktop GUI.

Agent 114 may manage a server-side generational cache 119 that mirrors generational cache 118. Server-side generational cache 119 allows agent 114 to determine when client software 112 can use an image from generational cache 118, and therefore not send image data for that frame update. Although some functions will be described with respect to generational cache 118, agent 114 may perform the same functions with respect to server-side generational cache 119. That is, both client software 112 and agent 114 perform the same algorithms to maintain the same information in respective generational caches 118, 119. Also, client software 112 and agent 114 may communicate to maintain the same information in generational caches 118, 119. For example, agent 114 may send a message to client software 112 indicating which information has been stored in generational cache 119 or when to perform a cache management algorithm as described below. It should be noted that it is not necessary for the host to store actual image data in server-side generational cache 119. Rather, agent 114 uses server-side generational cache 119 to track what image data resides in generational cache 118 using, e.g., hash values based on the image contents. As a result, server-side generational cache 119 may occupy very little memory space.

In one embodiment, generational cache 118 includes multiple levels 120. For example, each level 120 may correspond to different levels of persistence. As will be described in more detail below, levels 120 may include a short-term persistence level, a medium-term persistence level, and a long-term persistence level; however, other granularities of persistence may be used. Particular embodiments may place image blocks in different levels 120 of generational cache 118 depending on a system context.

As will be described in more detail below, client software 112 may determine when an epoch ends, such as when a discontinuity occurs in a user's workflow as inferred from changes to the desktop GUI, and then determine where to place written-over image blocks in levels 120. For example, client software 112 may determine which image blocks in the short-term persistence level should be promoted to the medium-term or long-term persistence levels based on a context of the current state of the image of the desktop GUI. In another embodiment, client software 112 may apply special handling for certain events that occur with respect to the desktop GUI and determine where to store image blocks in generational cache 118 (i.e., into which persistence level) based on a context associated with the events. For example, the context may be hints from the desktop GUI that are used to determine where to place image blocks in levels 120. As will be described in more detail below, client software 112 and agent 114 may use mouse clicks, keyboard inputs, the type of image being displayed, and other information as contextual information to determine where to store graphical data corresponding to overwritten image blocks.

Generational Cache

Figure 2:
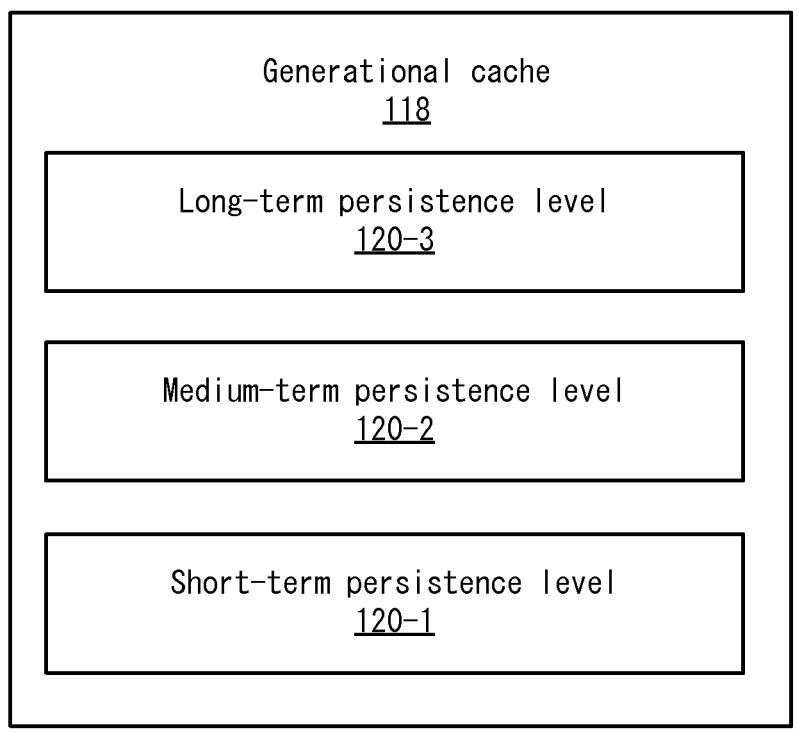
FIG. 2 depicts a more detailed example of a generational cache according to one embodiment.

FIG. 2 depicts a more detailed example of generational cache 118 according to one embodiment. As discussed above, remote desktop 108 and client device 104 may also employ a similar generational cache 118 and similar cache management algorithms. In this embodiment, generational cache 118 includes three levels, such as a short-term persistence level 120-1, a medium-term persistence level 120-2, and a long-term persistence level 120-3, but more levels may be used. The different levels may be distinguished by different cache management algorithms to evict image blocks that each level uses. For example, medium-term persistence level 120-2 and long-term persistence level 120-3 may use respective cache management algorithms that allow image blocks to persist in generational cache 118 longer than short-term persistence level 120-1. That is, an image block moved up to a longer term persistence level is more likely to be retained in generational cache 118 than if the image block remained in short-term persistence level 120-1.

By using a cache that maintains different persistence levels, a display remoting protocol can more efficiently process various types of desktop GUI changes. For example, in a limited bandwidth environment, user experience degrades when a large-scale desktop image change occurs, i.e., a large percentage of the entire desktop GUI changes. Even though in many VDI sessions the average bandwidth may be as low as 60 Kb/s, the VDI session may incur short-term bandwidth spikes up to 2 Mb/s+ when significant alterations in the image of the desktop GUI occur. In this situation, a display remoting protocol may redraw the entire display image by transmitting the image contents for an entire screen from the host to the client device, thus producing a spike in network activity that consumes a disproportionate amount of network bandwidth. For example, operations, such as minimizing or maximizing an application, launching a new application, slide transitions in a presentation, or browsing to a new web page, may cause large-scale transitions in the image of the desktop GUI. Such a full screen update may cause a 2 Mb/s bandwidth spike for 1 second on a local area network (LAN). However, if host 102 and client device 104 are connected via a 300 Kb/s wide area network (WAN), client software 112 may take seven seconds to complete the screen update.

Other techniques, such as image refinement, may exacerbate the limited bandwidth problem. Typically, in an effort to improve user experience in low bandwidth situations, existing display remoting protocols often initially transmit a very low resolution version of the image update to the user and then refine the image of the desktop GUI over the next few seconds. While this ensures that the user is rapidly provided with the updated image, the total amount of data transmitted over the link is increased to build a high-quality image from an initial low-quality image as compared to just initially transmitting the high-quality image. In essence, the display remoting protocol is trading a reduction in bandwidth spikes against increased channel utilization.

At least two classes of GUI operations can generate large-scale remote desktop image content changes: 1) user interactions, such as scrolling through documents or web pages or performing window drag operations; or 2) application generated changes such as video playback. While both classes can ultimately consume large amounts of network bandwidth, the types of image changes that each class generates can be radically different. In particular, while scrolling or window drag shifts a lot of the same content that remains on the screen across multiple frame updates, video updates cause less temporal locality. Thus, particular embodiments may cache image blocks for these events at different persistence levels.

Even when there is sufficient bandwidth to transmit small image changes in a frame, the reduction of data transmitted is also beneficial. For example, typing a word in a word processing program is typically responsive. However, the cumulative bandwidth that is used for small image changes may be useful, such as when users are charged per unit data transmitted.

The aforementioned classes of GUI operations may be correlated to the different persistence levels in generational cache 118. For bandwidth-intensive operations, such as the scroll or window drag operations described above, it may be important that generational cache 118 stores the imaging data associated with the operations to minimize the bandwidth to perform the operations. For example, the image blocks for a web page may be saved in short-term persistence level 120-1 such that the image blocks can be retrieved as they are re-displayed in different positions of display 110. However, there is typically a reduced benefit associated with persisting these image blocks much beyond the duration of the scrolling.

For medium-term persistence level 120-2, commands, such as open/close/maximize/minimize commands, may occur very infrequently, but when these commands occur, the relevant imaging information should be found in generational cache 118 to ensure a good user experience and minimize the bandwidth spikes. For example, when a user is working on a presentation in a presentation application and is occasionally alerted to the arrival of new e-mail messages, the user may transition to an e-mail program to check the message. This opens the e-mail program while possibly minimizing the presentation application. After checking the e-mail, the user may return to the presentation application. In order to quickly display the transition back to the presentation displayed in the presentation application, relevant image blocks for the presentation should be stored in medium-term persistence level 120-2 such that the image blocks can be used after the uses switches back to the presentation application.

Images that remain constant across the entire VDI session (i.e., desktop wallpaper, a start bar menu item, a right-click menu, and drop-down menus) may be well-suited to be stored in the long-term persistence level 120-3. Particular embodiments may use long-term persistence level cache to quickly render these images in high-definition in response to a user's mouse click to improve key user interactivity metrics. Additionally, certain image types may be presented quickly with lossless compression by ensuring that high-definition versions of these images (e.g., menus, buttons, icons, and ribbons) are retained using long-term persistence level 120-3 in generational cache 118.

Cache Management Upon Detecting Discontinuities in Workflow

Figure 3:
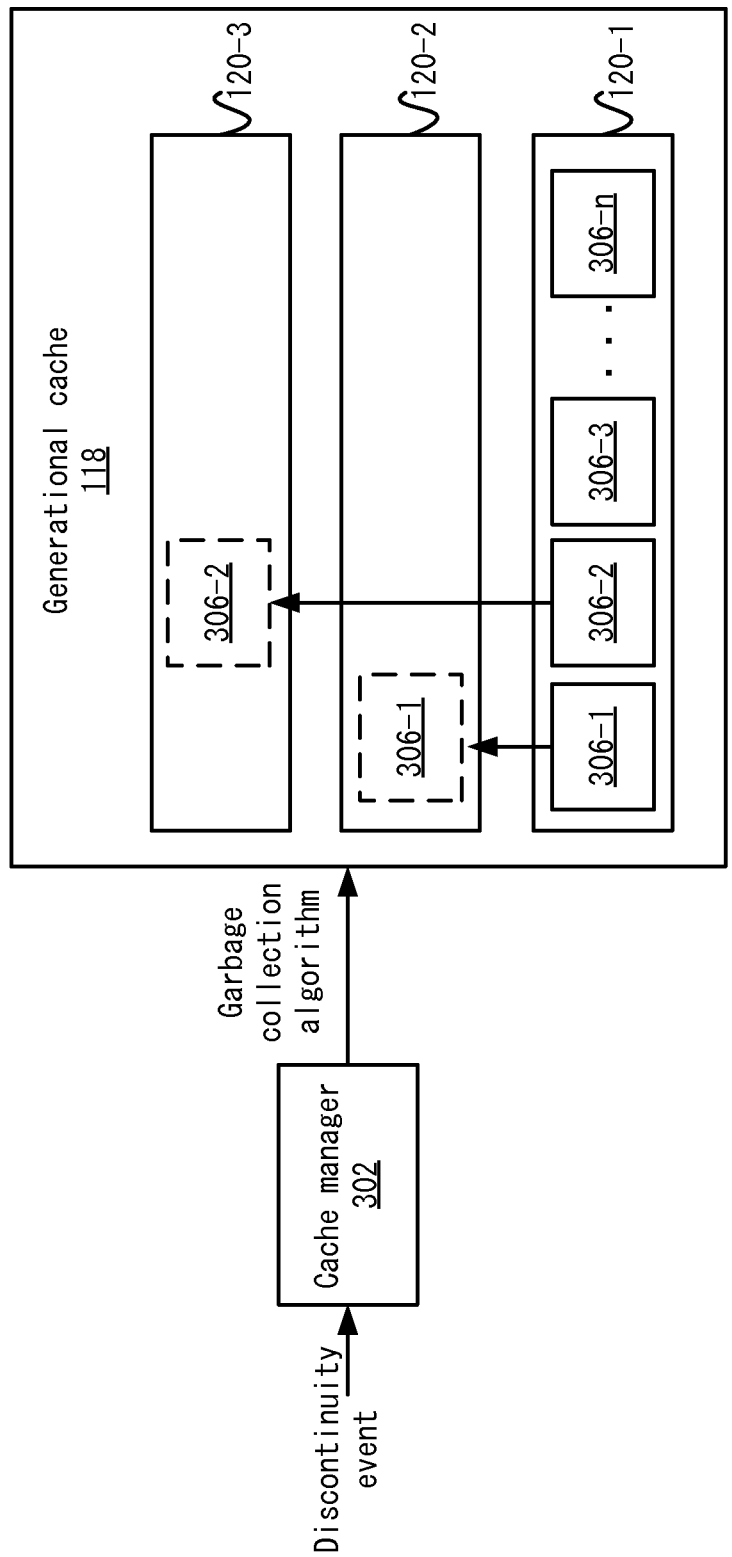
FIG. 3 depicts a first example of caching image blocks in the generational cache based on a concept of epochs and discontinuities according to one embodiment.

As discussed above, particular embodiments may use a context of the desktop GUI to place image blocks in different levels 120 of generational cache 118. FIG. 3 depicts a first example of caching image blocks in generational cache 118 based on a concept of epochs and discontinuities according to one embodiment. During the use of the desktop GUI, certain imaging events that may be infrequent, but yet critical, may occur. Particular embodiments detect these imaging events and use a context of the desktop GUI to promote certain image blocks to higher levels of persistence. As discussed above, agent 114 and client device 104 may implement the following functions that are described.

A cache manager 302 may use the concept of an epoch (e.g., a time period) to understand or model user behavior. In one embodiment, cache manager 302 is incorporated into agent 114 and/or client software 112 for managing generational caches 118, 119. An epoch may span a period of time during which the user is focused on a same activity, such as interacting with a presentation application. The epoch ends and a next epoch begins when a discontinuity occurs in the user's workflow and the user makes a significant change in his/her activity. For example, when the user switches to a different application, the cache manager 302 may recognize this as a discontinuity event. For example, the user may receive an e-mail message and switch from the presentation application to an e-mail application. When a discontinuity occurs, oftentimes, the image of the desktop GUI undergoes a large scale transition. Cache manager 302 considers the discontinuity the end of an epoch and also a time in which cache manager 302 should analyze the generational nature of generational cache 118.

Cache manager 302 may identify a discontinuity to detect the end of an epoch and in different ways. If hooks into the operating system or applications running on remote desktop 108 are available, particular embodiments may use these hooks to make decisions as to when a discontinuity event, such as a window minimize, maximize, application start events, or system menu actuation events occur. Where such system hooks are unavailable, cache manager 302 may analyze the frame updates of the image of the desktop GUI to determine by inference when the discontinuity event occurs. For example, cache manager 302 analyzes information including the scope of GUI update, the frequency of the update, or any accompanying events to identify a discontinuity. In one example, if cache manager 302 determines that a significant change in the desktop GUI has occurred, e.g., if a sufficiently large contiguous region of the display is updated, then cache manager 302 may determine that a discontinuity has occurred. In this case, the user may have transitioned from working on a presentation to checking an email, which would result in a large scale change the desktop GUI when the email program is displayed in place of the presentation application. For example, when an isolated change (i.e., not a continuous change, as would occur during video playback) occurs across a large percentage of the total screen area, cache manager 302 interprets this as a likely discontinuity in the user's workflow. Thus, a discontinuity may be a significant change in the user's focus, such as switching between applications. In one embodiment, cache manager 302 may compare changes for portions of the image of the desktop GUI to a threshold. If cache manager 302 determines the portion of the image change is above a threshold, then cache manager 302 may determine that a discontinuity has occurred. The threshold may be an absolute value, as a certain size rectangle or as a percentage of area of the GUI. Additionally, cache manager 302 may analyze other information that has been received, such as a mouse click, or double-click, to open an application may be received and used to confirm that the discontinuity occurred. For example, a large scale change of the image of the desktop GUI and a mouse click may confirm that the discontinuity occurred.

In one embodiment, when the discontinuity occurs, cache manager 302 analyzes image blocks in levels 120 of generational cache 118 with respect to a context associated with the discontinuity. During the analysis, cache manager 302 may perform a cache management algorithm, such as a garbage collection algorithm, on levels 120 of generational cache 118 to promote some image blocks to different levels of persistence. For example, the garbage collection algorithm may analyze image blocks in short-term persistence level 120-1 and promote some of these image blocks to medium- or long-term persistence levels 120-2 or 120-3. Also, although promotion from short-term persistence level 120-1 is discussed, cache manager 302 may promote image blocks from other levels, such as from medium-term persistence level 120-2, or demote image blocks from medium- or long-term persistence levels 120-2 to short-term persistence level 120-1.

Each cache "level" may be defined in accordance with a specified amount of space in the available memory of the device, which may of course vary from device to device. The amount of time a particular image block resides in any one of the levels depends on the rapidity with which data is introduced to the cache, which when full, necessitates older data to be evicted. In one embodiment, every image block received may be introduced into the short-term cache and data from this group is selectively added to longer-term cache depending on inferences made regarding the data as described in more detail below. The longest-term storage cache has the most selective policy so that least-recently used data is replaced, i.e., evicted, less often. The amount of space assigned to each level of cache may be adjusted dynamically to account for usage patterns by the particular user. For example, if the user appears to have lots of epoch with different display data for each, suggesting that the user may be switching between a large number of running programs, the long-term cache may be increased in size to accommodate this use of data, at the possible expense of more misses at the shorter-term caches.

In one example, cache manager 302 determines a context, which may be which image blocks in short-term persistence level 120-1 are "live", and promotes these image blocks to higher levels of persistence. In one embodiment, cache manager 302 determines image block liveness by determining which image blocks in short-term persistence level 120-1 correspond to image blocks in the current state of the image of the desktop GUI. To make this determination, cache manager 302 may map image blocks on the current image of the desktop GUI to image blocks in short-term persistence level 120-1. Cache manager 302 then promotes the image blocks that correspond to the current image of the desktop GUI to medium-term persistence level 120-2 or long-term persistence level 120-3. In one embodiment, cache manager 302 may not purge any remaining image blocks that exist in short-term persistence level 120-1 from generational cache 118. Rather, these image blocks remain in short-term persistence level 120-1 until they are naturally evicted via the standard cache replacement algorithms, such as least-recently used (LRU) algorithms, that are used to purge data from short-term persistence level 120-1. LRU algorithms are well known in the field of data caches.

Cache manager 302 may make the decision of whether to promote image blocks to medium-persistence level 120-2 or long-term persistence level 120-3 based on a series of heuristics that may depend on the context. For example, as described above, a presentation being worked on in a presentation application may correspond to a medium-term persistence and thus image blocks associated with the presentation are promoted to medium-term persistence level 120-2. In another example, desktop wallpaper may be associated with a longer-term persistence and cache manager 302 promotes image blocks for the desktop wallpaper to long-term persistence level 120-3.

In one example shown in FIG. 3, cache manager 302 has promoted an image block 306-1 to medium-term persistence level 120-2. In this case, image block 306-1 may be associated with a presentation being worked on in a presentation application in the current image of the desktop GUI. Also, cache manager 302 has promoted an image block 306-2 to longer-term persistence level 120-3. In this case, image block 306-2 may be associated with desktop wallpaper or a start bar in the current image of the desktop GUI. It will be understood that cache manger 302 may promote multiple image blocks for the presentation, wallpaper, etc.

In one embodiment, to ensure that server-side generational cache 119 and the generational cache 118 are synchronized, the display remoting protocol on remote desktop 108 may declare epochs and discontinuities that have occurred and send indications of the discontinuity to client device 104. This would trigger the same garbage collection algorithm on both host 102 and client device 104 that use the same criteria for promoting image blocks and generational cache 118. Thus, both generational caches 118, 119 remain synchronized after the discontinuity.

In one embodiment, cache manager 302 may also automatically place a first stable image following the discontinuity into long-term persistence level 120-3. Alternatively, cache manager 302 may place a stable image that occurs at the end of the epoch when the next discontinuity occurs. This provides a stable image that cache manager 302 can use in case the user transitions back to an application. For example, a user may be using an e-mail application and then opens a presentation in a presentation application. Cache manager 302 may capture an image of the final state of the display of the e-mail application into long-term persistence level 120-3. The user may then interact for some period of time with slides in the presentation application before potentially transitioning back to the e-mail application. In this case, the image of the e-mail application has been stored in long-term persistence level 120-3 and thus is more likely to be still in generational cache 118 due to the longer-term persistence level. Accordingly, particular embodiments may use the image blocks for the image of the e-mail application to generate the updated image.

Cache manager 302 may also identify whether a discontinuity that occurs is associated with other information from the desktop GUI. For example, the discontinuity may be associated with a user action, such as a user depressing up and down arrows on a keyboard. For example, this action may correspond to slide transitions or paging through a document. For these events, cache manager 302 may promote image blocks to a medium-term persistence level 120-2. In this case, a user may spend some time moving back and forth through the slides or document but persisting the image blocks is not likely required for the whole duration of the user's session.

Accordingly, particular embodiments may cache all image blocks received from agent 114 into short-term persistence level 120-1 until a discontinuity event occurs. At this point, cache manager 302 determines the liveness of image blocks in short-term persistence level 120-1 and promotes live image blocks to longer-term persistence levels 120.

Caching Using Hints from the Desktop GUI

In a second method, particular embodiments may detect events other than a discontinuity and handle these events based on a context determined from the desktop GUI. For example, the context may be hints that cache manager 302 determines from the desktop GUI. Cache manager 302 then uses these hints to determine a persistence in which to store image blocks in generational cache 118.

Figure 4:
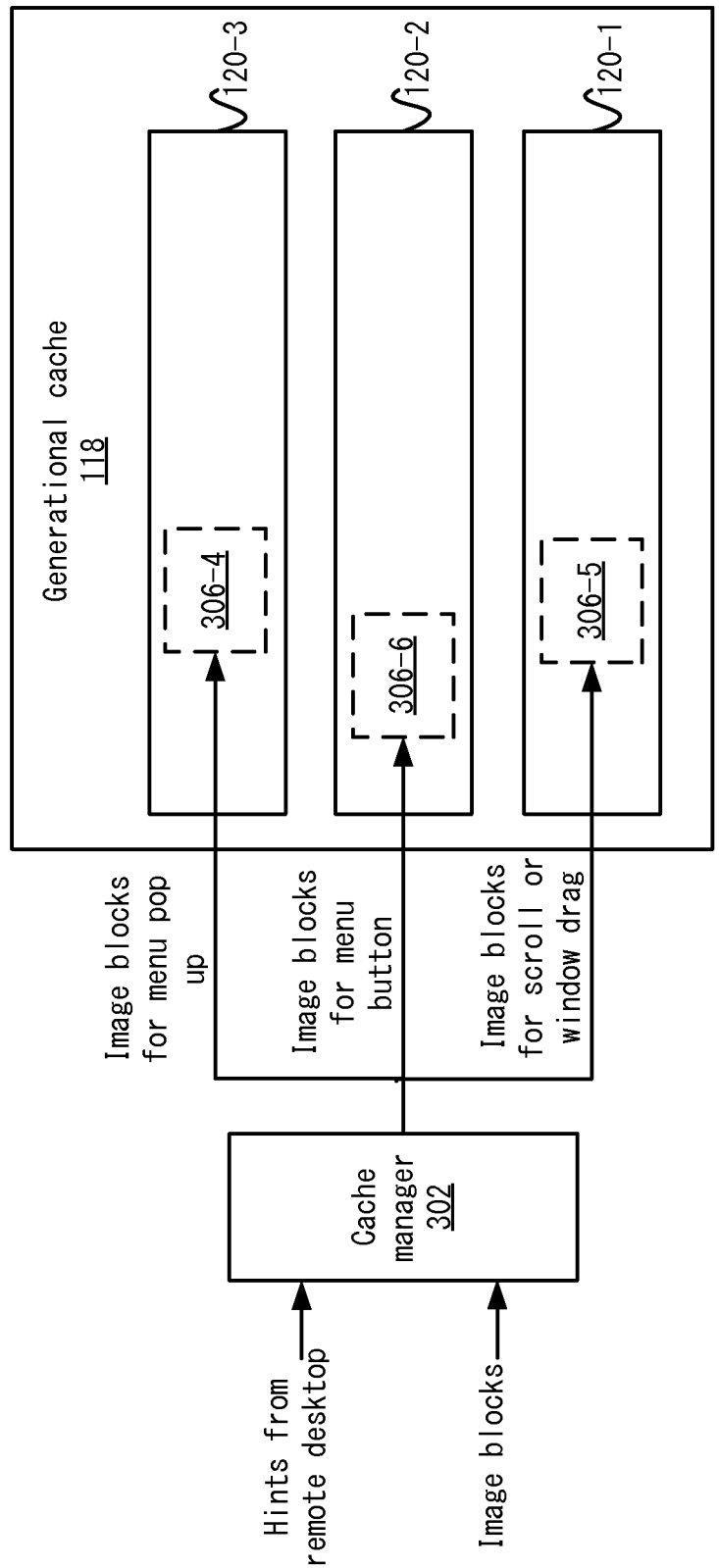
FIG. 4 depicts a second example for using hints to determine special handling of storing image blocks in the generational cache is used according to one embodiment.

FIG. 4 depicts an example for using hints to manage generational cache 118. Cache manager 302 detects special events from the desktop operating system by, subscribing to system events, and determines where to store image blocks in generational cache 118 based on the events. As described above, cache manager 302 may be located in both agent 114 and client software 112. In one embodiment, agent 114 may detect the events and signal to client device 104 where to store certain image blocks in generational cache 118, or vice versa. In other embodiments, host 102 and client device 104 may run similar algorithms that detect the same events and cache image blocks in the same levels 120 in generational cache 118. In one embodiment, the hints may be information that can be determined without requiring hooks into the operating system or applications. However, if this information is available, cache manager 302 may use this information.

In one embodiment, cache manager 302 detects an event that requires special handling using the hints and analyzes hints to determine a persistence level in which to cache image blocks. For example, in general, cache manager 302 would store image blocks into short term persistence level 120-1. However, in some cases, cache manager 302, by analyzing the hints, determines that image blocks should be stored in higher levels of persistence.

In one example, localized updates located in proximity to a mouse pointer and in conjunction with a right mouse click likely correspond to a menu popup/drop down and cache manager 302 should cache these image blocks with long-term persistence. Thus, when cache manager 302 determines a frame update to the image of the desktop GUI is located in proximity to where the mouse pointer is located and in conjunction with receiving a right mouse click, cache manager 302 caches image blocks for that update into long-term persistence level 120-3. The event in this case may be the menu update and the hint is the mouse pointer location. In this case, agent 114 sends the image update of the pop-up/drop down menu and cache manager 302 stores these image blocks in long-term persistence level 120-3. For example, as shown in FIG. 4, cache manager 302 may cache an image block (or multiple image blocks) 306-4 into long-term persistence level 120-3. In a similar situation, an update localized to the bottom left of the screen coupled with a left mouse click likely corresponds to a start menu pop-up. In this case, cache manager 302 may cache image blocks for this update in long-term persistence level 120-3 because it is likely that the start menu pop-up may be selected multiple times. Also, it is desirable that client software 112 store a high definition version of the start menu pop-up that can be readily displayed quickly instead of using image refinement.

In another example, when cache manager 302 detects that a user has depressed a left mouse button and a rapid series of updates is received, cache manager 302 may determine that these updates likely correspond to a scroll or window drag operation. In this case, cache manager 302 may determine that the image blocks should be cached in short-term persistence level 120-1. For example, as shown in FIG. 4, cache manager 302 may cache an image block (or multiple image blocks) 306-5 into short-term persistence level 120-1. For this event, the updates may be useful as the document is being scrolled, but cache manager 302 may not need the updates once the user finishes scrolling. Cache manager 302 may also use other hints that are available, such as motion vectors that are extracted from commands received from the operating system by the an agent, the remoting protocol encoder component or a motion estimation algorithm component (not shown). These hints may be provided to cache manager 302 using a separate communication channel provided by the remoting protocol. For example, if cache manager 302 receives a hint that indicates image portions are moving in a certain direction concurrently with a mouse interaction, then cache manager 302 may determine that a window scroll operation is being performed. Cache manager 302 can then determine which level of persistence in which image blocks for a corresponding update should be cached.

In a third example, for image blocks that correspond to problem image types, e.g., menu buttons, in which it may be important to avoid lossy compression and the image refinement problems as described above, cache manager 302 may cache these image blocks in longer-term persistence levels. For example, in situations where small image blocks are stored in generational cache 118, there may be a lot of commonality across menu, buttons, and icons across, for instance, related applications in a suite, such as word processing applications, presentation applications, and spreadsheet applications. Cache manager 302 may detect the problem image types and have these image blocks cached in longer-term persistence levels. For example, when very small image updates occur around the area of the mouse pointer that are about the size of a toolbar icon that switches briefly to a highlighted (e.g., brighter, yellower, or simply altered) state and then back to its previous state when the mouse moves away, then cache manager 302 may determine this is mouse roll-over event for a toolbar icon. Alternatively or in addition, cache manager 302 may receive a hint from an agent as described above on the remote desktop that subscribes to application events indicating a toolbar icon interaction As a consequence of this determination or hint, cache manager 302 may cache an image block (or multiple image blocks) 306-6 into medium term persistence level 120-2. Thus, when a user closes an initial application and opens another application that includes similar menu buttons, client device 104 may use the losslessly-encoded image buttons that have been cached for the other application.

In a fourth example, while cache manager 302 may exclude video from generational cache 118 altogether, some animated image types may be stored in generational cache 118. For example, cache manager 302 may store image blocks for some operations, such as blinking or flashing buttons that repeat, in generational cache 118. In one example, cache manager 302 may identify a screen portion that is exhibiting repetitive behavior and cache image blocks for this entity in short-term persistence cache 120-1, since the short-term cache will retain the repeated states sufficiently long to satisfy the repeated display updates, and as with all LRU-based cache replacement algorithms, with each re-use of the image data stored in the short-term cache 306-5, the time to replacement is restarted. Once the repetition is no longer needed, the image data used for the repetition may be replaced with other more recently used image data.

Method Flow

Figure 5:
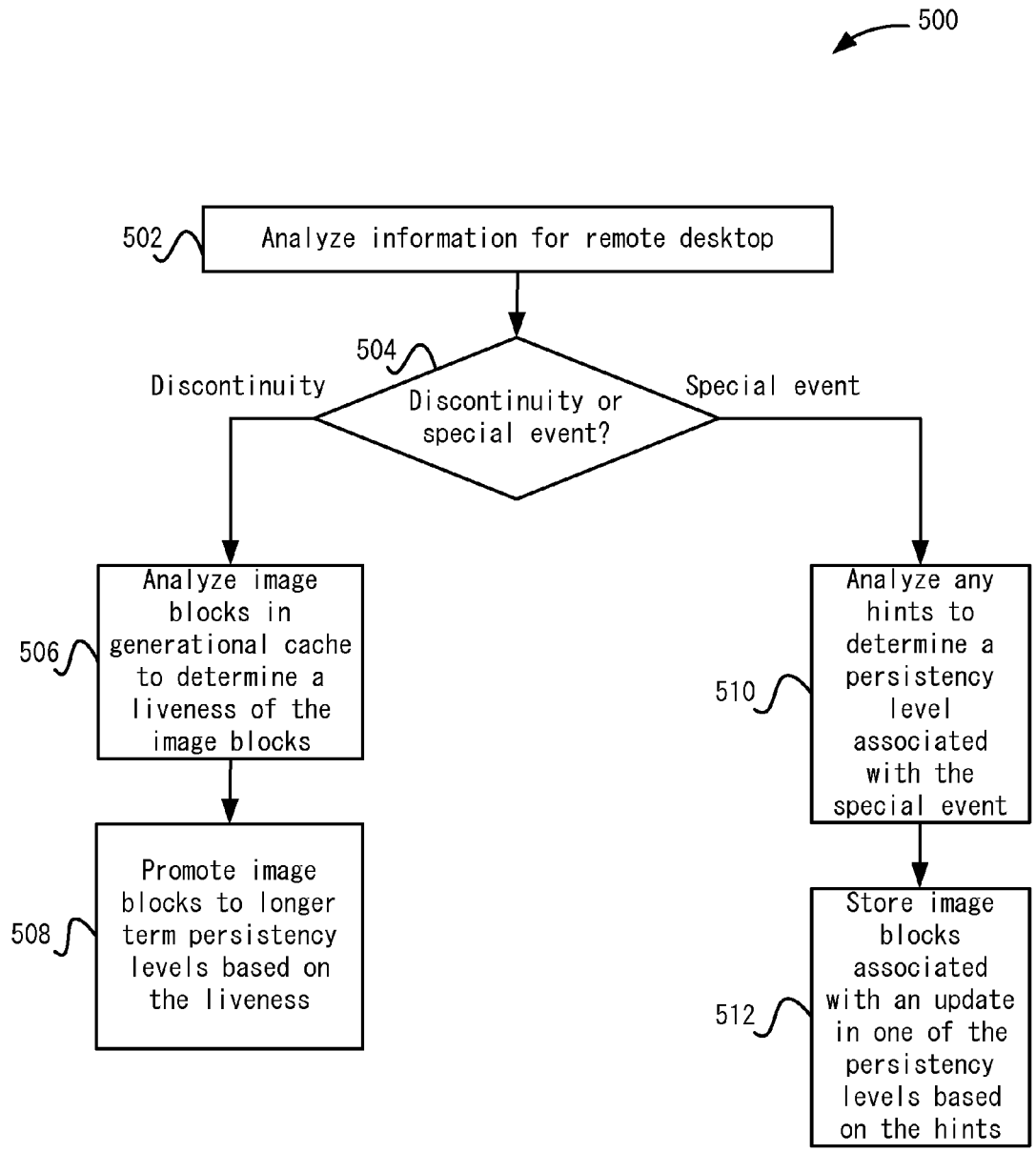
FIG. 5 depicts a simplified flowchart of a method for caching image blocks according to one embodiment.

FIG. 5 depicts a simplified flowchart 500 of a method for caching image blocks according to one embodiment. At operation 502, cache manager 302 analyzes information for the desktop GUI. For example, as described above, cache manager 302 determines an event occurs with respect to the desktop GUI by analyzing frame updates and/or user actions. At operation 504, cache manager 302 compares the updates with previously defined or configured rules as previously described to determine if a discontinuity or special event has occurred. If a discontinuity has occurred, at 506, cache manager 302 analyzes image blocks in generational cache 118 to determine a liveness of the image blocks. As described above, cache manager 302 may use a status of a current image of the desktop GUI to determine the liveness. At 508, cache manager 302 promotes image blocks to longer term persistence levels based on the liveness. For example, cache manager 302 promotes some image blocks to medium term persistence level 120-2 or long term persistence level 102-3.

If cache manager 302 detects a special event has occurred, at 510, cache manager 302 analyzes any hints from the desktop GUI to determine a persistence level associated with the special event. As described above, cache manager 302 may use a location of a mouse pointer to determine that a popup menu has been displayed. At 512, cache manager 302 stores image blocks associated with an update in one of the persistence levels based on the hints. For example, cache manager 302 stores some image blocks in medium term persistence level 120-2 or long term persistence level 102-3.

System Overview

Figure 6:
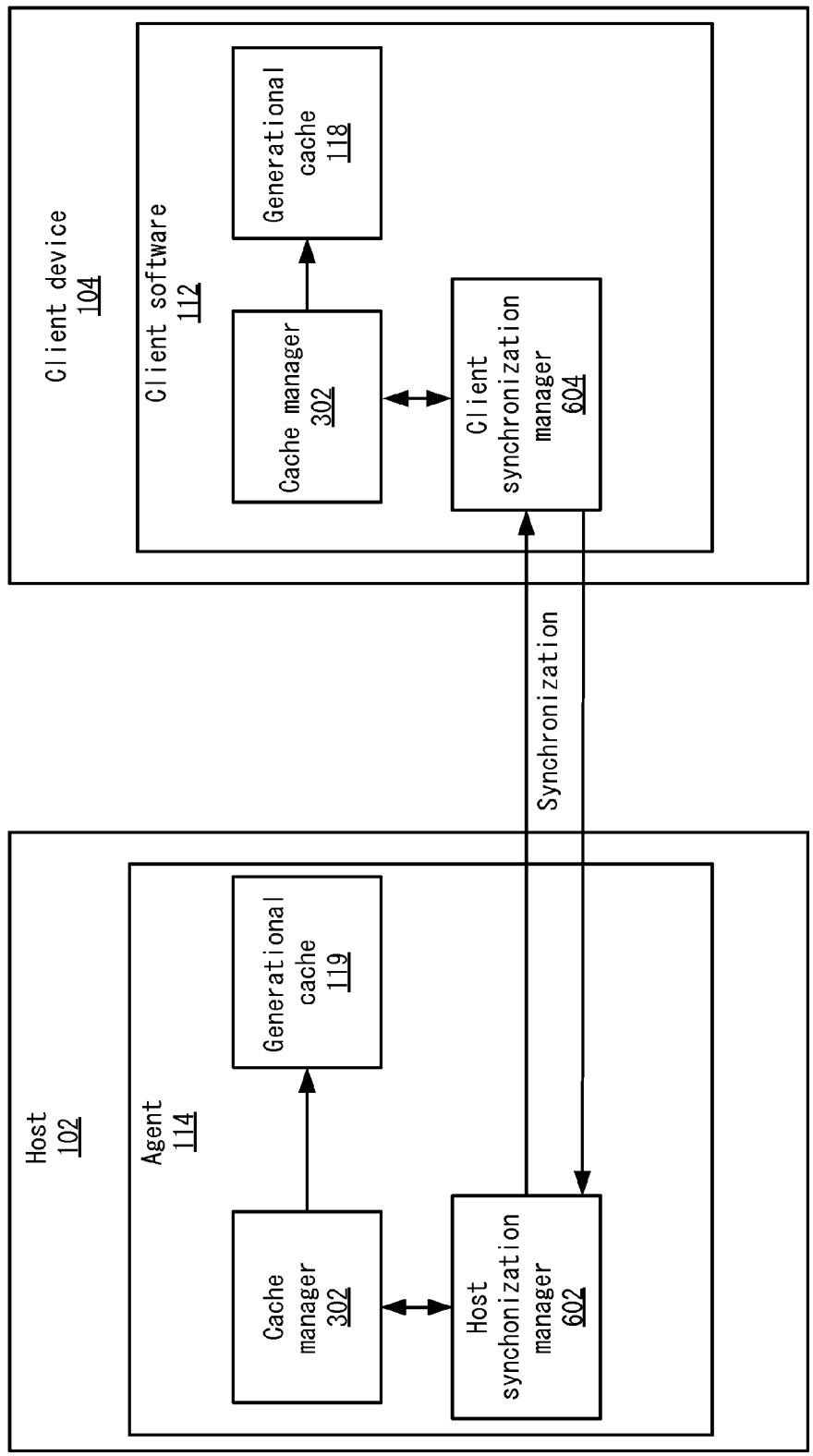
FIG. 6 depicts a more detailed example of a host and a client device according to one embodiment.

FIG. 6 depicts a more detailed example of host 102 and client device 104 according to one embodiment. Agent 114 and client software 112 both include cache manager 302. In one embodiment, agent 114 includes a host synchronization manager 602 that sends messages to a client synchronization manager 604 of client software 112. The messages may include indications of when a discontinuity occurs or where to cache certain image blocks based on hints from the desktop GUI. Alternatively, client synchronization manager 604 may sends similar messages to host synchronization manager 602.

CONCLUSION

Accordingly, particular embodiments use different levels of generational cache 118 to improve the user experience for displaying images of the desktop GUI. In one embodiment, the cache management and cache access of generational cache 118 may use the same key-value store look-up. Particular embodiments may implement generational cache 118 in different ways. In one example, generational cache 118 includes separate structures for each persistence level. Then, particular embodiments handle insertion and eviction on a per structure basis. Although each level 120 may be associated with a different cache, tracking stacks may be implemented for each level. Thus, the replacement policy can be determined and enforced for each persistence level in isolation and only one stack needs to be accessed per insertion event. Additionally, an eviction cache may be maintained to promote blocks to different persistence levels when a block has been incorrectly assigned to a persistence level.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for storing a remote desktop graphical user interface (GUI) image block in a cache, the cache including a plurality of persistence levels, the method comprising:
   maintaining, by a computing device, each persistence level in the plurality of persistence levels;
   identifying, by the computing device, an event associated with an update to the remote desktop GUI;
   determining, by the computing device, a context for the event;
   determining, by the computing device, when a first type of event based on a hint related to a display of content on the remote desktop GUI or a second type of event based on a discontinuity event related to the display of content for remote desktop GUI has occurred;
   when the first type of event has occurred, performing:
      selecting, by the computing device, one of the persistence levels for the event based on the context; and
      storing, by the computing device, an image block corresponding to the update with the selected one of the persistence levels;
   when the second type of event has occurred, performing:
      reviewing, by the computing device, a set of image blocks in one of the persistence levels that are associated with the event based on the context; and
      moving, by the computing device, an image block in the set of image blocks to another persistence level based on the context.

2. The method of claim 1, wherein maintaining comprises maintaining each persistence level in the plurality of persistence levels using a different cache replacement process, wherein the cache replacement process for each persistence level is based on a different level of persistence to evict image blocks of the remote desktop GUI from each persistence level.

3. The method of claim 1, wherein the event comprises the discontinuity event for a workflow of a user using the remote desktop GUI.

4. The method of claim 3, wherein the discontinuity event is determined based on a change of an image of the remote desktop GUI.

5. The method of claim 3, wherein moving the image block comprises:
   determining a current state of an image of the remote desktop GUI as the context, and
   moving the image block from a lower persistence level to a higher persistence level if the image block corresponds to an image block in the current state of the image.

6. The method of claim 5, wherein:
   different image blocks in the cache are classified differently according to the context for the remote desktop GUI, and
   the different image blocks are moved to different persistence levels based on the different classifications.

7. The method of claim 3, further comprising storing the image of the remote desktop GUI in a persistence level in the plurality of persistence levels in response to determining the discontinuity event, wherein the image is stored before or after the discontinuity event.

8. The method of claim 1, wherein:
   the context comprises the hint detected from the remote desktop GUI, and
   the selected one of the persistence levels is determined based on the hint.

9. The method of claim 8, wherein image blocks for the remote desktop GUI are stored in a short term persistence level unless the hint detected from the remote desktop GUI indicates the image block should be stored in a higher level persistence level.

10. The method of claim 8, wherein:
    the hint comprises information received from a peripheral device, and
    the hint from the peripheral device is analyzed and used to select one of the persistence levels in which to store the image block.

11. The method of claim 8, wherein:
    the hint comprises information for an image type, and
    different image types cause the image block to be stored in different persistence levels.

12. A non-transitory computer-readable storage medium containing instructions for storing a remote desktop graphical user interface (GUI) image block in a cache, the cache including a plurality of persistence levels, the instructions, when executed, for controlling a computer system to be configured for:
    maintaining each persistence level in the plurality of persistence levels;
    identifying an event associated with an update to the remote desktop GUI;
    determining a context for the event;
    determining when a first type of event based on a hint related to a display of content on the remote desktop GUI or a second type of event based on a discontinuity event related to the display of content for remote desktop GUI has occurred;
    when the first type of event has occurred, performing:
       selecting one of the persistence levels for the event based on the context; and
       storing an image block corresponding to the update with the selected one of the persistence levels;
    when the second type of event has occurred, performing:
       reviewing a set of image blocks in one of the persistence levels that are associated with the event based on the context; and
       moving an image block in the set of image blocks to another persistence level based on the context.

13. The non-transitory computer-readable storage medium of claim 12, wherein maintaining comprises maintaining each persistence level in the plurality of persistence levels using a different cache replacement process, wherein the cache replacement process for each persistence level is based on a different level of persistence to evict image blocks of the remove desktop GUI from each persistence level.

14. The non-transitory computer-readable storage medium of claim 12, wherein the event comprises the discontinuity event for a workflow of a user using the remote desktop GUI.

15. The non-transitory computer-readable storage medium of claim 14, wherein moving the image block comprises:
    determining a current state of an image of the remote desktop GUI as the context, and moving the image block from a lower persistence level to a higher persistence level if the image block corresponds to an image block in the current state of the image.

16. The non-transitory computer-readable storage medium of claim 15, wherein:
different image blocks in the cache are classified differently according to the context for the remote desktop GUI, and
the different image blocks are moved to different persistence levels based on the different classifications.

17. The non-transitory computer-readable storage medium of claim 12, wherein:
the context comprises the hint detected from the remote desktop GUI, and
the selected one of the persistence levels is determined based on the hint.

18. The non-transitory computer-readable storage medium of claim 17, wherein image blocks for the remote desktop GUI are stored in a short term persistence level unless the hint detected from the remote desktop GUI indicates the image block should be stored in a higher level persistence level.

19. The non-transitory computer-readable storage medium of claim 17, wherein:
the hint comprises information received from a peripheral device or an image type, and
the hint from the peripheral device is analyzed and used to determine the persistence level in which to store the image block.

20. An apparatus configured to store a remote desktop graphical user interface (GUI) image block in a cache, the cache including a plurality of persistence levels, the apparatus comprising:
one or more computer processors; and
a non-transitory computer-readable storage medium comprising instructions, that when executed, control the one or more computer processors to be configured for:
maintaining each persistence level in the plurality of persistence levels;
identifying an event associated with an update to the remote desktop GUI;
determining a context for the event;
determining when a first type of event based on a hint related to a display of content on the remote desktop GUI or a second type of event based on a discontinuity event related to the display of content for remote desktop GUI has occurred;
when the first type of event has occurred, performing:
selecting one of the persistence levels for the event based on the context; and
storing an image block corresponding to the update with the selected one of the persistence levels;
when the second type of event has occurred, performing:
reviewing a set of image blocks in one of the persistence levels that are associated with the event based on the context; and
moving an image block in the set of image blocks to another persistence level based on the context.

* * * * *